(12) United States Patent
Sacks et al.

(10) Patent No.: US 6,510,015 B2
(45) Date of Patent: Jan. 21, 2003

(54) MAGNETIC DISC HAVING PHYSICAL SERVO PATTERNS WITH A MAGNETIC CARRIER, AND METHOD OF MAKING AND USING THE SAME

(75) Inventors: Alexei H. Sacks, Edina, MN (US); Timothy F. Ellis, Tonka Bay, MN (US); Patrick J. Korkowski, Bloomington, MN (US); Karl A. Belser, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 84 days.

(21) Appl. No.: 09/726,786

(22) Filed: Nov. 30, 2000

(65) Prior Publication Data

US 2001/0036030 A1 Nov. 1, 2001

Related U.S. Application Data

(63) Continuation of application No. PCT/US00/42493, filed on Nov. 30, 2000.
(60) Provisional application No. 60/170,239, filed on Dec. 10, 1999.

(51) Int. Cl.[7] .............................................. G11B 21/02
(52) U.S. Cl. ............................................ 360/75; 360/29
(58) Field of Search ............................... 360/78.05, 75, 360/77.03, 78.11, 48, 135, 313, 29; 369/44.25, 44.26, 13, 14, 43, 11, 15

(56) References Cited

U.S. PATENT DOCUMENTS

| 3,593,331 A | * | 7/1971 | Connell et al. ...... 360/77.02 X |
|---|---|---|---|
| 3,905,043 A | | 9/1975 | Frank ........................... 360/77 |
| 4,090,145 A | | 5/1978 | Webb ............................. 329/1 |
| 4,131,828 A | | 12/1978 | Houshi ....................... 318/138 |
| 4,272,845 A | | 6/1981 | Fiumani ....................... 375/20 |
| 4,308,505 A | | 12/1981 | Messerschmitt ............. 331/25 |
| 4,318,141 A | | 3/1982 | Haynes .......................... 360/77 |
| 4,353,093 A | | 10/1982 | Durvin, Jr. et al. .......... 358/160 |
| 4,414,589 A | | 11/1983 | Oliver et al. .................. 360/77 |
| 4,578,699 A | | 3/1986 | Takanashi et al. ............. 358/44 |
| 4,641,326 A | | 2/1987 | Tomisawa .................... 375/108 |
| 4,777,544 A | * | 10/1988 | Brown et al. .................. 360/75 |
| 4,802,050 A | | 1/1989 | Miyabayashi et al. ....... 360/135 |
| 4,823,205 A | | 4/1989 | Hannon et al. ................ 369/14 |
| 4,825,310 A | | 4/1989 | Song ....................... 360/77.08 |
| 4,841,502 A | | 6/1989 | Murakami et al. ............. 369/13 |
| 4,884,141 A | | 11/1989 | Hyakutake ................... 358/174 |
| 4,910,615 A | | 3/1990 | Monard ........................ 360/75 |
| 4,926,408 A | | 5/1990 | Murakami et al. ............ 369/58 |
| 4,935,835 A | | 6/1990 | Godwin et al. .............. 360/135 |
| 4,942,609 A | | 7/1990 | Meyer .......................... 360/25 |
| 4,954,906 A | | 9/1990 | Nakamura et al. ........ 360/77.08 |
| 5,023,856 A | | 6/1991 | Raaymakers et al. .......... 369/32 |
| 5,065,096 A | | 11/1991 | Muck et al. .................. 324/248 |
| 5,083,226 A | | 1/1992 | Shiiki et al. .............. 360/77.05 |
| 5,138,511 A | | 8/1992 | Hoshimi et al. ............. 360/135 |
| 5,229,855 A | | 7/1993 | Siann .......................... 358/183 |
| 5,229,986 A | | 7/1993 | Mizokami et al. ............ 369/59 |

(List continued on next page.)

FOREIGN PATENT DOCUMENTS

EP        0511622 A2        11/1992

*Primary Examiner*—David Hudspeth
*Assistant Examiner*—K. Wong
(74) *Attorney, Agent, or Firm*—Westman, Champlin & Kelly, P.A.

(57) ABSTRACT

A magnetic medium comprises a magnetic disc having a read surface that has a plurality of tracks, at least some having servo sectors. The servo sectors comprise a plurality of magnetic irregularities, such as pits or regions of reduced magnetic coercivity, arranged in a servo pattern along the servo sector at a servo frequency. A magnetic pattern is recorded in the disc along the servo sector at a high carrier frequency. A process for manufacturing the servo pattern and for recovering servo data from the servo pattern are also described.

20 Claims, 8 Drawing Sheets

U.S. PATENT DOCUMENTS

| | | | | |
|---|---|---|---|---|
| 5,241,702 A | | 8/1993 | Dent | 455/278.1 |
| 5,296,995 A | * | 3/1994 | Yonezawa et al. | 360/135 |
| 5,301,072 A | | 4/1994 | Wilson | 360/77.01 |
| 5,303,269 A | | 4/1994 | Altes | 375/78 |
| 5,307,330 A | | 4/1994 | Okamura | 369/32 |
| 5,321,564 A | | 6/1994 | Takahashi et al. | 360/77.04 |
| 5,325,244 A | | 6/1994 | Takano et al. | 360/77.03 |
| 5,335,073 A | | 8/1994 | Yamamoto | 348/738 |
| 5,343,340 A | | 8/1994 | Boutaghou et al. | 360/77.08 |
| 5,347,410 A | | 9/1994 | Narita et al. | 360/77.04 |
| 5,379,171 A | | 1/1995 | Morehouse et al. | 360/10.5 |
| 5,383,171 A | | 1/1995 | Mizokami et al. | 369/59 |
| 5,394,277 A | | 2/1995 | Pahr et al. | 360/53 |
| 5,402,278 A | * | 3/1995 | Morita | 360/77.05 |
| 5,424,881 A | | 6/1995 | Behrens et al. | 360/40 |
| 5,426,544 A | | 6/1995 | Narita et al. | 360/77.04 |
| 5,448,430 A | | 9/1995 | Bailey et al. | 360/77.12 |
| 5,483,393 A | | 1/1996 | Mento et al. | 360/77.08 |
| 5,519,683 A | | 5/1996 | Mizokami et al. | 369/59 |
| 5,537,282 A | | 7/1996 | Treves et al. | 360/135 |
| 5,545,989 A | | 8/1996 | Tian et al. | 324/212 |
| 5,563,746 A | | 10/1996 | Bliss | 360/53 |
| 5,568,327 A | | 10/1996 | Pahr et al. | 360/53 |
| 5,577,016 A | | 11/1996 | Inagaki et al. | 369/110 |
| 5,579,189 A | | 11/1996 | Morehouse et al. | 360/105 |
| 5,583,706 A | | 12/1996 | Dudley et al. | 360/46 |
| 5,585,975 A | | 12/1996 | Bliss | 360/65 |
| 5,590,009 A | | 12/1996 | Ishida | 360/135 |
| 5,592,349 A | | 1/1997 | Morehouse et al. | 360/98.08 |
| 5,594,595 A | | 1/1997 | Zhu | 360/31 |
| 5,602,692 A | | 2/1997 | Freitas et al. | 360/77.08 |
| 5,619,480 A | * | 4/1997 | Seo et al. | 369/14 |
| 5,625,508 A | | 4/1997 | Brown et al. | 360/77.02 |
| 5,626,941 A | | 5/1997 | Ouano | 428/141 |
| 5,632,669 A | | 5/1997 | Azarian et al. | 451/54 |
| 5,668,678 A | | 9/1997 | Reed et al. | 360/51 |
| 5,682,272 A | | 10/1997 | Taroda et al. | 360/53 |
| 5,687,147 A | | 11/1997 | Kim | 369/44.25 |
| 5,694,267 A | | 12/1997 | Morehouse et al. | 360/97.02 |
| 5,696,639 A | | 12/1997 | Spurbeck et al. | 360/5.1 |
| 5,705,926 A | | 1/1998 | Senda et al. | 324/244 |
| 5,726,818 A | | 3/1998 | Reed et al. | 360/51 |
| 5,729,396 A | | 3/1998 | Dudley et al. | 360/51 |
| 5,734,267 A | | 3/1998 | Senda et al. | 324/244 |
| 5,757,576 A | | 5/1998 | Kosugi | 360/78.14 |
| 5,760,984 A | | 6/1998 | Spurbeck et al. | 360/51 |
| 5,760,986 A | | 6/1998 | Morehouse et al. | 360/67 |
| 5,771,127 A | | 6/1998 | Reed et al. | 360/51 |
| 5,771,141 A | | 6/1998 | Ohtsuka et al. | 360/113 |
| 5,786,950 A | | 7/1998 | Zook et al. | 360/41 |
| 5,786,951 A | | 7/1998 | Welland et al. | 360/46 |
| 5,838,514 A | * | 11/1998 | Smith et al. | 360/75 |
| 5,858,474 A | | 1/1999 | Meyer et al. | 427/555 |
| 5,889,641 A | * | 3/1999 | Belser et al. | 360/113 |
| 5,995,309 A | | 11/1999 | Suzuki et al. | 360/55 |
| 5,999,360 A | * | 12/1999 | Meyer et al. | 360/77.02 |
| 6,104,557 A | * | 8/2000 | Kasai et al. | 360/46 |
| 6,104,579 A | * | 8/2000 | Kamoshita et al. | 360/135 |
| 6,262,860 B1 | * | 7/2001 | Ishida | 360/78.05 |

\* cited by examiner

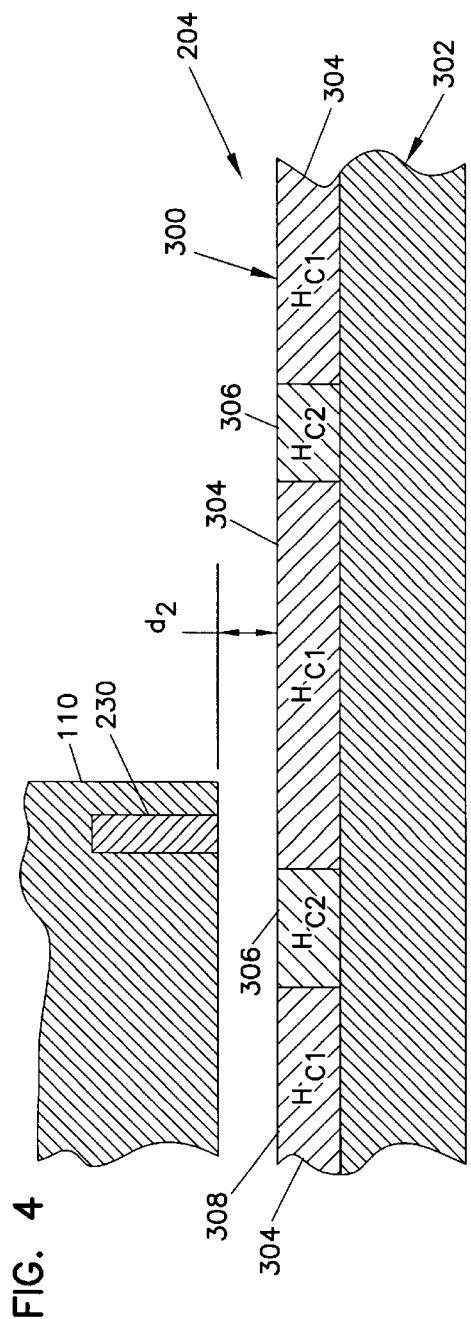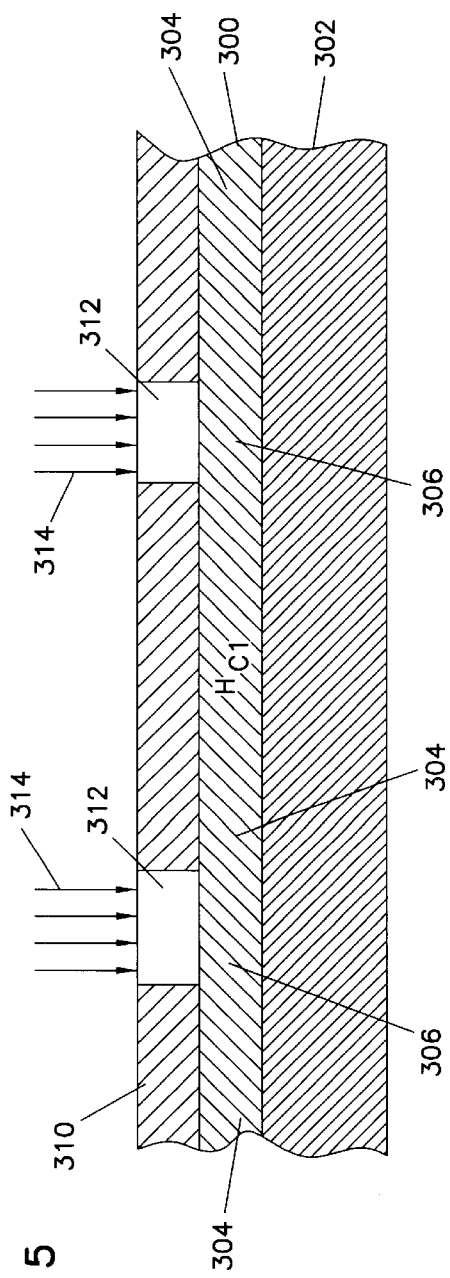

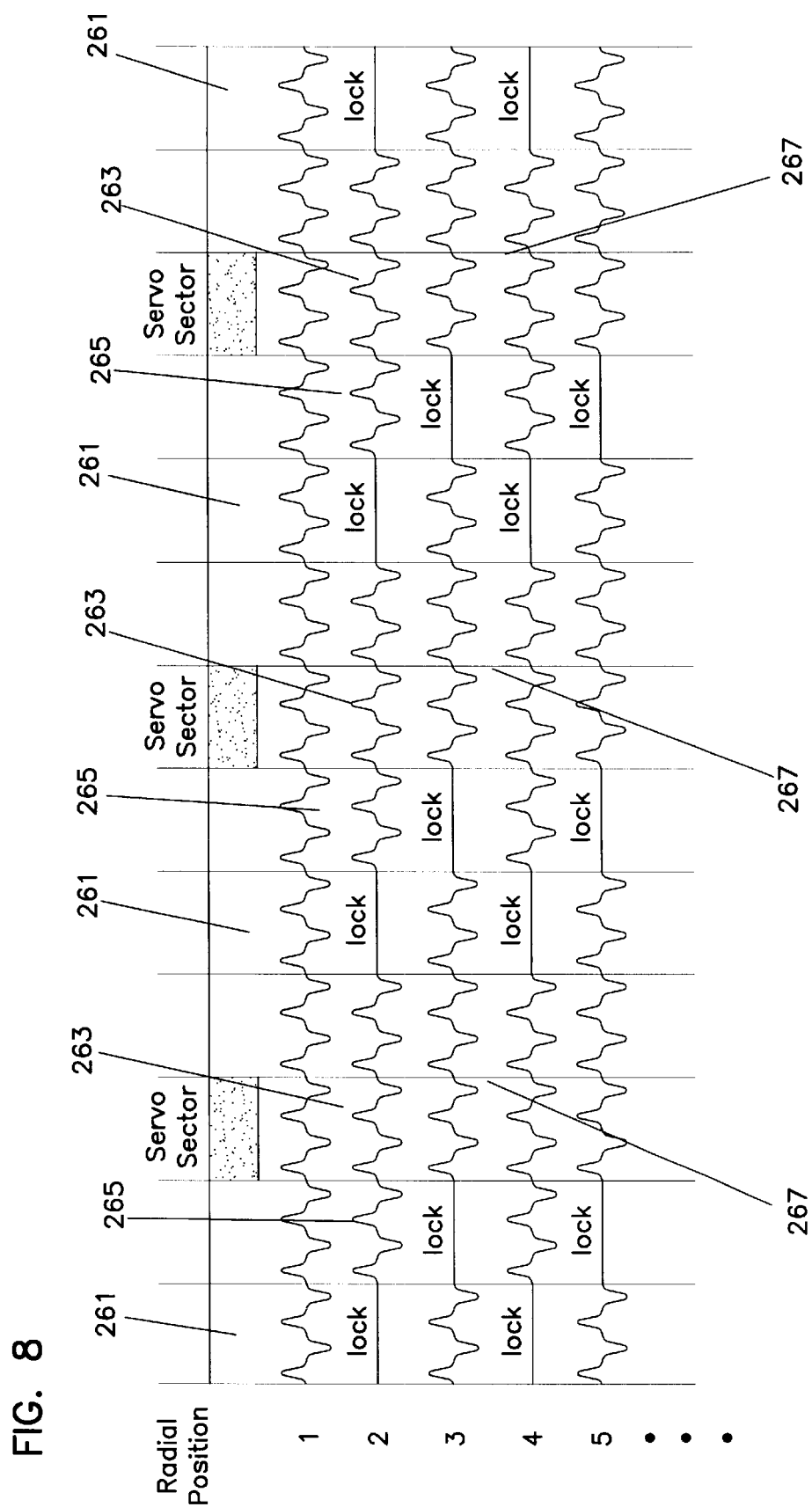

MAGNETIC DISC HAVING PHYSICAL SERVO PATTERNS WITH A MAGNETIC CARRIER, AND METHOD OF MAKING AND USING THE SAME

CROSS-REFERENCE TO CO-PENDING APPLICATION

This application claims priority of U.S. Provisional Application No. 60/170,239, filed Dec. 10, 1999 by Alexei H. Sacks and Timothy F. Ellis for "Method of Generating Servo Data with Servo Patterned Media" and is a continuation and claims priority of International Application No. PCT/US00/42493, filed on Nov. 30, 2000, published in English, by Seagate Technology LLC for "Magnetic Disc Having Physical Servo Patterns with a Magnetic Carrier, and Method of Making and Using the Same", which in turn claims priority of the aforementioned U.S. Provisional Application.

FIELD OF THE INVENTION

This invention relates to embedded servo data on magnetic discs, and particularly to a disc having irregularities of magnetic properties forming an embedded servo pattern, and a process for making and using the same.

BACKGROUND OF THE INVENTION

In magnetic disc drives, data bits recorded on concentric tracks of magnetic discs are established by the orientation of magnetic dipoles in the disc medium. As the disc rotates, a confronting read head senses changes in the magnetic field due to changes in dipole orientation of data bits passing the head. Data may be in the form of user data and servo data. Servo data are used by the disc drive to control operations of the drive, such as head position, indexing, identification and track and sector addressing. In embedded servo systems, servo data are recorded on the same disc surface as user data; the servo data appearing in servo sectors located in predefined spokes spaced at regular intervals along the tracks. In contrast to embedded servo systems, dedicated servo systems employ a separate disc surface dedicated to the servo data. While the present invention is useful with dedicated servo systems, it will be described in conjunction with embedded servo systems.

Servo data are ordinarily recorded at a lower frequency than are user data. Presently user data are recorded at frequencies above about 500 Megahertz (MHz) and in some cases into the Gigahertz (GHz) range, whereas servo data are usually recorded at lower frequencies (30 to 120MHz).

The areal density of data recorded on a disc is limited by the amount of data that may be recorded on a single track and the number of concentric tracks that may be compacted onto the disc (track density). The track density is limited by track width and spacing, by the width of the read/write head confronting the disc surface, by the flying characteristics of the head, and by the positioning of servo data. There are problems in writing magnetic servo data for high density discs, particularly in the replication of the process for mass production of the discs. Consequently, interest has arisen in forming servo patterns with irregularities in the magnetic properties of the magnetic disc. These irregularities are usually in the form of pits or grooves in the recording surface. The pits or grooves are of sufficient depth as to cause a discontinuity in the magnetic field sensed by the read head. The pattern of discontinuities represents servo data.

One problem with the use of surface irregularities, such pits and grooves, is that the pits or grooves were of such a depth as to have a limiting effect on track density. More particularly, the pits or grooves needed to be deep enough to create magnetic field discontinuities so that the recovered servo data signal had a satisfactory signal-to-noise ratio. The deep pits and grooves caused difficulties with medium deposition and corrosion, and debris accumulated in the pits, often affecting the recorded servo data. While more shallow pits and grooves would permit fewer medium difficulties, shallow pits and grooves do not create magnetic field discontinuities that are necessary for satisfactory signal-to-noise ratios of the recovered servo signal. The present invention provides a solution to this and other problems, and offers other advantages over the prior art.

SUMMARY OF THE INVENTION

The present invention employs a disc medium having irregularities in magnetic properties in a pattern defining the servo pattern. A high frequency magnetic carrier signal is written through the servo pattern so that a read head passing by the servo pattern reads a varying magnetic field intensity to recover the servo data, such as by amplitude demodulation of the magnetic carrier. In one form of the invention, the irregularities are surface irregularities in the disc having elevations different from the elevation of the nominal read surface of the disc. In another form of the invention, the irregularities are due to altered magnetic properties of the medium.

In accordance with one embodiment of the present invention, a magnetic medium includes a read surface having a plurality of tracks. Surface irregularities in the read surface are in the form of pits or grooves that extend a defined depth into the body from the read surface along a servo portion of at least one of the plurality of tracks. The pits or grooves are arranged in a servo pattern that has a servo burst frequency. A magnetic carrier signal is recorded in the magnetic medium along the servo portion at a carrier frequency greater than the servo frequency.

In accordance with another embodiment of the magnetic medium, the magnetic coercivity of the disc is reduced in regions arranged in the servo pattern.

According to another aspect of the invention, a manufacturing process is provided by which a plurality of tracks are defined on the read surface of a magnetic disc. At least one servo sector portion is defined along each of at least some of the plurality of tracks, and first and second minimum readback signal amplitudes to be produced by a confronting read head are defined to represent a first and second binary values. Irregularities are formed in the disc along each servo sector portion to define a desired servo pattern having a servo burst frequency. In one embodiment, the irregularities are pits in the disc surface; in another embodiment the irregularities are regions of reduced magnetic coercivity. A magnetic carrier signal is written into the magnetic disc along the servo sector portion at a carrier frequency greater than the servo burst frequency. In the embodiment employing pits, the pits have a depth, h, into the read surface of $$h = \frac{\lambda}{2\pi} \ln\left(\frac{V_2}{V_1}\right),$$

where $V_1$ and $V_2$ are the first and second signal amplitudes and $\lambda$ is the wavelength of the magnetic carrier signal.

According to one embodiment of the manufacturing process, the magnetic carrier signal is written into the disc by positioning a servo writer to confront a first radius of the read surface. The magnetic carrier signal is continuously written onto the disc along at least that much of the circumference at the first radius that includes a servo sector portion and a portion adjacent the servo sector portion. The servo writer is stepped to a second radius adjacent the first radius, and synchronized to the magnetic pattern written at the first radius. The magnetic carrier signal is continuously written onto the disc along at least that much of the circumference at the second radius that includes the servo sector portion and a portion adjacent the servo sector portion. The process is repeated until all of the servo sector portions are written with the magnetic carrier.

In one embodiment, the radial repositioning of the servo writer is in half-track increments.

According to another aspect of the present invention, the servo data are read from the magnetic disc by reading a varying magnetic field from a servo sector portion of a track on the disc to derive a read signal. The read signal is demodulated using a demodulating signal at the carrier frequency to derive a servo signal. The servo signal is recovered using a second signal at the servo burst frequency to derive servo data.

Other features and benefits that characterize the present invention will be apparent upon reading the following detailed description and review of the associated drawings.

BRIEF DESCRIPTION OF THE DRAWINGS

FIG. 4 is a section view illustrating the geometry of regions of reduced magnetic coercivity forming the servo pattern according to another embodiment of the present invention.

FIG. 5 is a section view, as in FIG. 4, illustrating the process of forming the regions of reduced magnetic coercivity.

FIG. 8 is a diagram of a representation of a recording process useful in explaining the process flow illustrated in FIG. 7.

DETAILED DESCRIPTION OF ILLUSTRATIVE EMBODIMENTS

Figure 1:
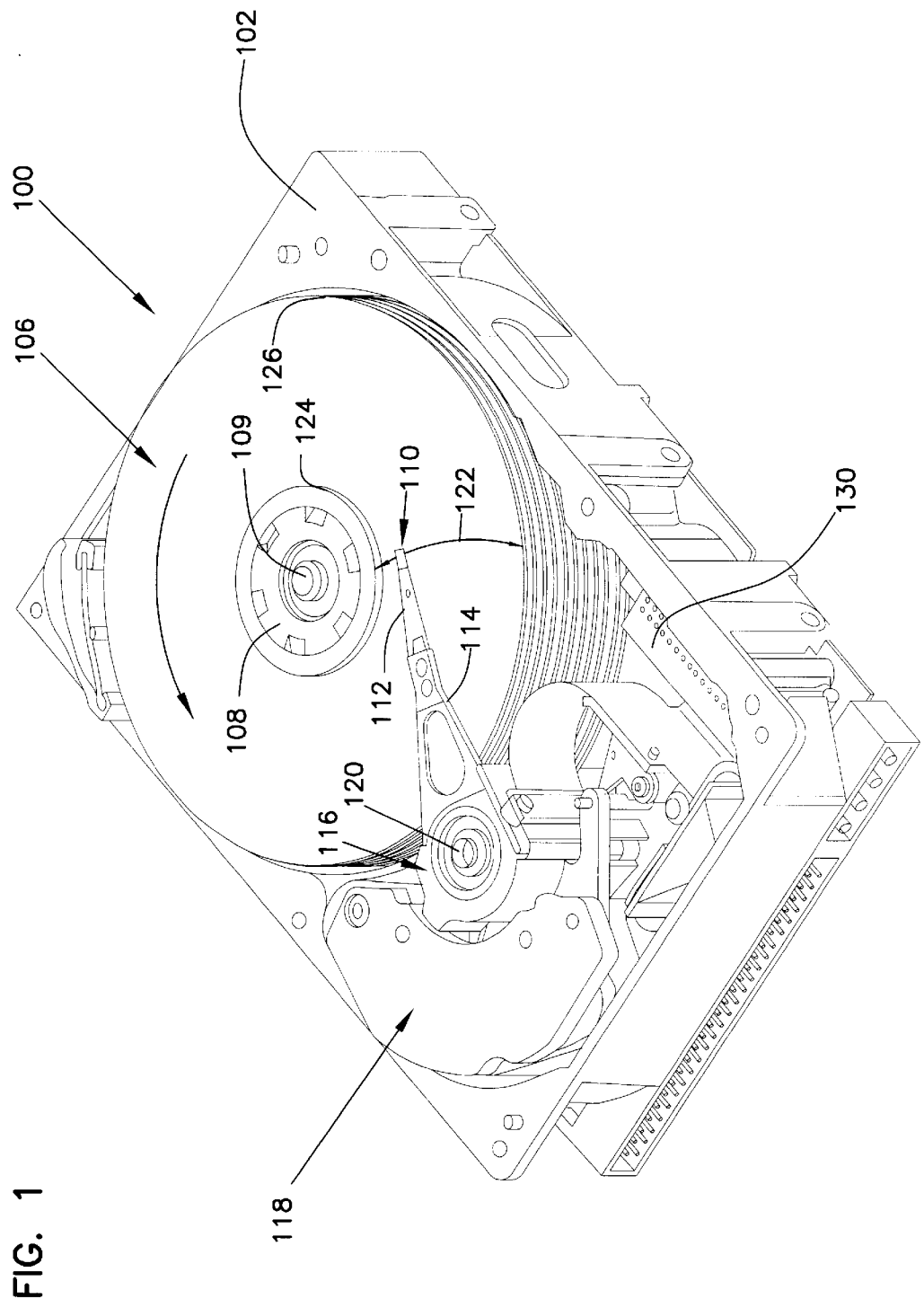
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs, which are mounted for co-rotation about central axis 109. Each disc surface has an associated head-slider 110 that is mounted to disc drive 100 for communication with the confronting disc surface. Head-slider 110 includes a slider structure arranged to fly a designed distance above the associated disc surface of an individual disc of disc pack 106, and a transducing head arranged to write data to, and read data from, concentric tracks on the confronting disc surface. In the example shown in FIG. 1, head-sliders 110 are supported by suspensions 112 which are in turn attached to track accessing arms 114 of an actuator 116. Actuator 116 is driven by a voice coil motor (VCM) 118 to rotate the actuator, and its attached heads 110, about a pivot shaft 120. Rotation of actuator 116 moves the heads along an arcuate path 122 to position the heads over a desired data track between a disc inner diameter 124 and a disc outer diameter 126. Voice coil motor 118 is driven by servo electronics included on circuit board 130 based on signals generated by the heads of head-sliders 110 and a host computer (not shown). Read and write electronics are also included on circuit board 130 to supply signals to the host computer based on data read from disc pack 106 by the read heads of head-sliders 110, and to supply write signals to the write head of head-sliders 110 to write data to the discs.

Figure 2:
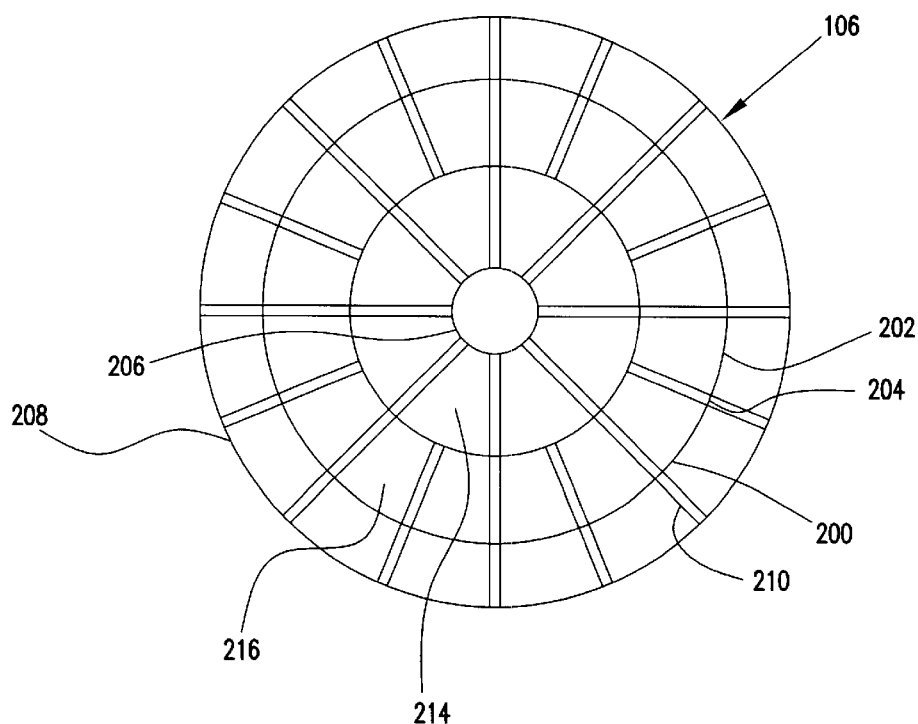
FIG. 2 is a plan view illustrating the layout of tracks, user data and servo sectors on a disc.

FIG. 2 illustrates the layout of tracks 200 on disc 106. Each track has a plurality of user data sectors 202 and a plurality of servo sectors 204. There are a plurality of concentric tracks 200 between an inner track 206 and an outer track 208. Radially-extending spokes 210 cross each track at selected locations along each track to define the servo sectors 204 for the respective track. Each servo sector contains a recorded servo pattern representative of servo data. Conveniently, disc 106 may be recorded by zone bit recording techniques, well known in the art, in which different radial zones 212 and 214 are recorded at different user data frequencies.

Figure 3:
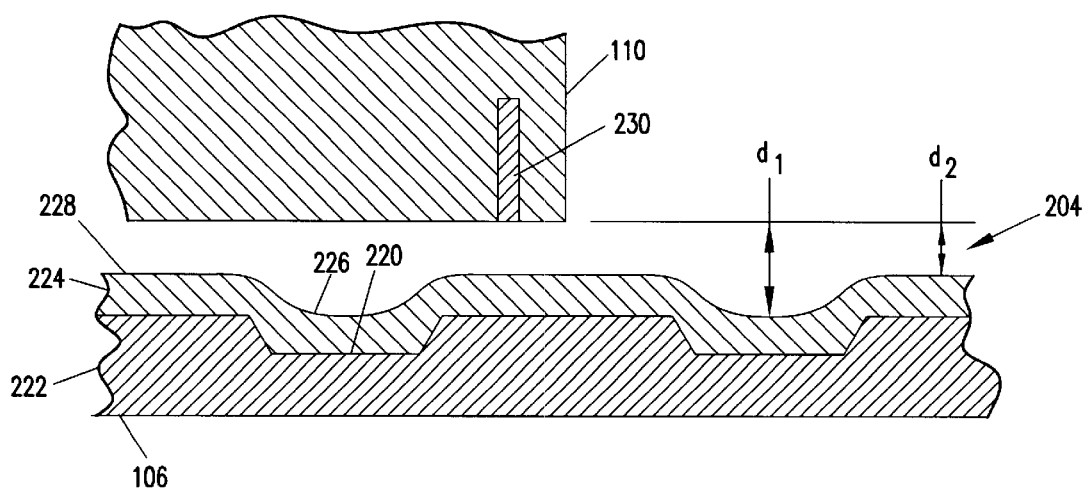
FIG. 3 is a section view illustrating the geometry of the pits or grooves forming the servo pattern according to one embodiment of the present invention.

In accordance with the present invention, the servo pattern in servo sectors 204 is recorded as a pattern of irregularities in the magnetic properties of the disc arranged to represent servo data. The pattern represents, for example, track identification, indexing marks and information, servo address, head number, sector number and position error information. FIG. 3 illustrates the pattern of irregularities as pits or grooves in the surface of the disc. As used herein, the term "pit" encompasses any surface irregularity, including depressions and rises, without regard to shape, that define elevations different from the nominal surface of the disc. Hence, a "pit" may be manifest as a circular or square depression into the surface of the disc on a single track, or as a groove depression into the disc surface across several tracks. While it is preferred surface irregularities, such as pits, be depressions into the disc surface, the surface irregularities may also be manifest as raised bumps or ridges on a single track or across several tracks. Hence, as used herein, "pit" encompasses depressions into the disc surface as well as rises above the disc surface. Other embodiments, such as illustrated in FIGS. 4 and 5, employ irregularities as regions of coercive discontinuities. In either case, a varying magnetic field intensity is sensed by the read head passing the servo pattern.

FIG. 3 illustrates the servo sector 204 on a track of disc 106. Pits 220 are formed into the surface of a substrate 222 of disc 106. The pits may be etched or cut into the substrate 222, or simply pressed into the substrate during fabrication of the substrate. A magnetic film 224 is formed on substrate 222, such as by a sputter deposition technique, well known in the art. Conventionally, a carbon overcoat and lubrication (not shown) are formed on magnetic film 224, also well known in the art. Magnetic film 224 conforms to the contour of the surface of substrate 222 to form pits 226 in the read surface 228 of the disc. The pattern of pits 226 along the length of servo sector 204 defines the servo pattern, representing servo data. When disc 106 is rotated at the operating rotational velocity, pits 226 pass head 110 at the design servo frequency, such as between 20 MHz and 45 MHz.

A high-frequency magnetic carrier is written onto the disc. In one form of the invention, the high-frequency magnetic carrier is written onto the disc after assembly of the disc to the disc drive by applying the high-frequency carrier signal to the write head of the disc drive. In another form of the invention, the high-frequency carrier is written with a servo writer. In either case, the carrier frequency is greater than the servo burst frequency, such as between about 75 and 100 MHz for servo burst frequencies of 20 to 45 MHz. The lower limit of the carrier frequency range should be high enough to achieve modulation with the servo burst frequency herein described, whereas the upper limit of the carrier frequency is limited only by the ability of the electrical circuits and components of the servo recovery system. The carrier signal may be in the lower end of the user data frequency. In preferred embodiments, the carrier frequency is 2.8 times that of the servo burst frequency of pits 226, although a carrier frequency of at least twice the servo frequency is adequate.

As illustrated in FIG. 3, the head and slider 110 aerodynamically "fly" over the surface 228 of disc 106 as the disc rotates. Read member 230 of head 110 senses changing magnetic fields from the disc to provide readback signals representative of information represented by the changing magnetic fields. Read member 228 may, for example, be the gap between the poles of an inductive read head, or the magnetoresistive element of a magnetoresistive read head or giant magnetoresistive head.

When reading the servo pattern illustrated in FIG. 3, the read head 110 reads the magnetic carrier frequency written to the disc to provide a readback signal. The readback signal will be amplitude modulated due to pits 226, the amplitude of the modulation being dependent on the depth of the pits. More particularly, the voltage of the signal produced by head 110 is represented by $$V = k \cdot e^{-\frac{2\pi d}{\lambda}},$$

where V is the signal amplitude, k is a constant of proportionality, d is the distance from the head to the center of magnetic film 224 and λ is the wavelength of the carrier frequency. Where the head confronts a pit 226 having a pit depth h, the ratio of the readback peak amplitudes is:

$$\frac{V_2}{V_1} = k \cdot e^{-\frac{2\pi h}{\lambda}},$$

where h is the depth of pit 226, $V_2$ is the peak readback amplitude over the medium surface 228, and $V_1$ is the peak readback amplitude over a pit 226. Consequently, $$h = d_1 - d_2 = \frac{\lambda}{2\pi} \ln\left(\frac{V_2}{V_1}\right),$$

where $d_1$ is the distance between the head and the bottom of pit 226 and $d_2$ is the distance between the head and the medium surface 228.

It will be appreciated that the depth h of pits 226 can be made small without affecting the amplitude modulation ratio, simply by increasing the frequency (reducing the wavelength λ) of the magnetic carrier. Consequently, the present invention minimizes flyability issues of the flying head 110 by reducing the depth of the pits. A high amplitude modulation ratio is maintained by recording a high frequency magnetic carrier through the servo sector containing the pits.

FIG. 4 illustrates the servo sector 204 on a track of disc 106. In this case, magnetic film 300 is formed on the surface of substrate 302 of disc 106 and includes regions 304 having a high coercivity ($H_{C2}$) and regions 306 having a low coercivity ($H_{C1}$). Consequently, top surface 308 of disc 106 is smooth and has no surface irregularities to affect flying characteristics of head 110. Regions 306 are arranged in the pattern of the servo pattern and are formed by applying an ion beam to magnetic film 300 after film 300, with a high coercivity of $H_{C2}$, has been deposited onto substrate 302. As in the case of FIG. 3, the pattern of regions 306 along the length of servo sector 204 defines the servo pattern, representing servo data. When disc 106 is rotated at the operating rotational velocity, regions 306 pass head 110 at the design servo frequency, such as between 20 MHz and 45 MHz. The head and slider 110 aerodynamically "fly" over the surface 308 as the disc rotates. Read member 230 of head 110 senses changing magnetic fields from the disc to provide readback signals representative of information represented by the changing magnetic fields.

FIG. 5 illustrates a process of forming regions 306 of lowered coercivity in magnetic film 300. After magnetic film 300 has been formed on substrate 302, and preferably before application of carbon overcoat or lubricant to the top surface of the film, a patterned mask 310 is formed on the top surface of magnetic film 300. Mask 310 includes apertures 312 in the pattern of the servo data. Initially, magnetic film 300 has a high coercivity ($H_{C2}$), suitable for recording data. An ion beam 314 is directed at mask 310 and through apertures 312 to impinge on regions 306 of film 300. The ion beam may be any suitable ion beam, such as nitrogen, argon, etc. The ion beam affects the magnetic properties of the material of film 300 in the regions 306 to lower the coercivity of the film in regions 306 to $H_{C1}$, while leaving a high coercivity, $H_{C2}$, in regions 304 protected by mask 310. We have observed that reduction of coercivity in film 300 is dependent on the strength of the ion beam and duration of the process. Thus, higher ion beam intensities and longer application of the beam to regions 304 increases the reduction of coercivity in regions 304.

As in the case of the embodiment of FIG. 3, a high-frequency magnetic carrier is written onto the disc after assembly of the disc to the disc drive, or with a servo writer. The carrier frequency is preferably between about 75 and 100 MHz for servo burst frequencies of 20 to 45 MHz. In preferred embodiments, the carrier frequency is 2.8 times that of the servo burst frequency of regions 306, although a carrier frequency of at least twice the servo frequency is adequate.

When reading the servo pattern illustrated in FIG. 4, the readback signal will be amplitude modulated due to regions 306. Unlike the embodiment of FIG. 3, the amplitude of the modulation is not dependent on the depth of any pits, or even the thickness of film 300. The voltage of the signal produced by head 110 is represented by $$V = kH_c \cdot e^{\frac{2\pi d}{\lambda}},$$

where V is the signal amplitude, $H_C$ is the magnetic coercivity, k is a constant of proportionality, d is the distance from the head to the center of magnetic film 300 and $\lambda$ is the wavelength of the carrier frequency. For a given wavelength $\lambda$ of the carrier frequency and a given fly height d of head 110 over surface 308, the ratio of the readback peak amplitudes detected between region 304, having a coercivity $H_{C2}$, and region 306, having a reduced coercivity $H_{C1}$, is:

$$\frac{V_2}{V_1} = k \cdot \frac{H_{C2}}{H_{C1}},$$

where $V_2$ is the peak readback amplitude over the medium surface 308 adjacent regions 304, and $V_1$ is the peak readback amplitude over surface 308 adjacent regions 306. Thus, the ratio of the peak readback amplitudes is directly proportional to the ratio of the coercivities of the medium in regions 304 and 306:

$$\frac{V_2}{V_1} \propto \frac{H_{C2}}{H_{C1}}.$$

In preferred embodiments, $H_{C1}$ is about 700 to 900 Oersteds below $H_{C2}$. Therefore, $\Delta H_C = H_{C2} - H_{C1}$ and is between about 700 and 900 Oe.

Figure 6:
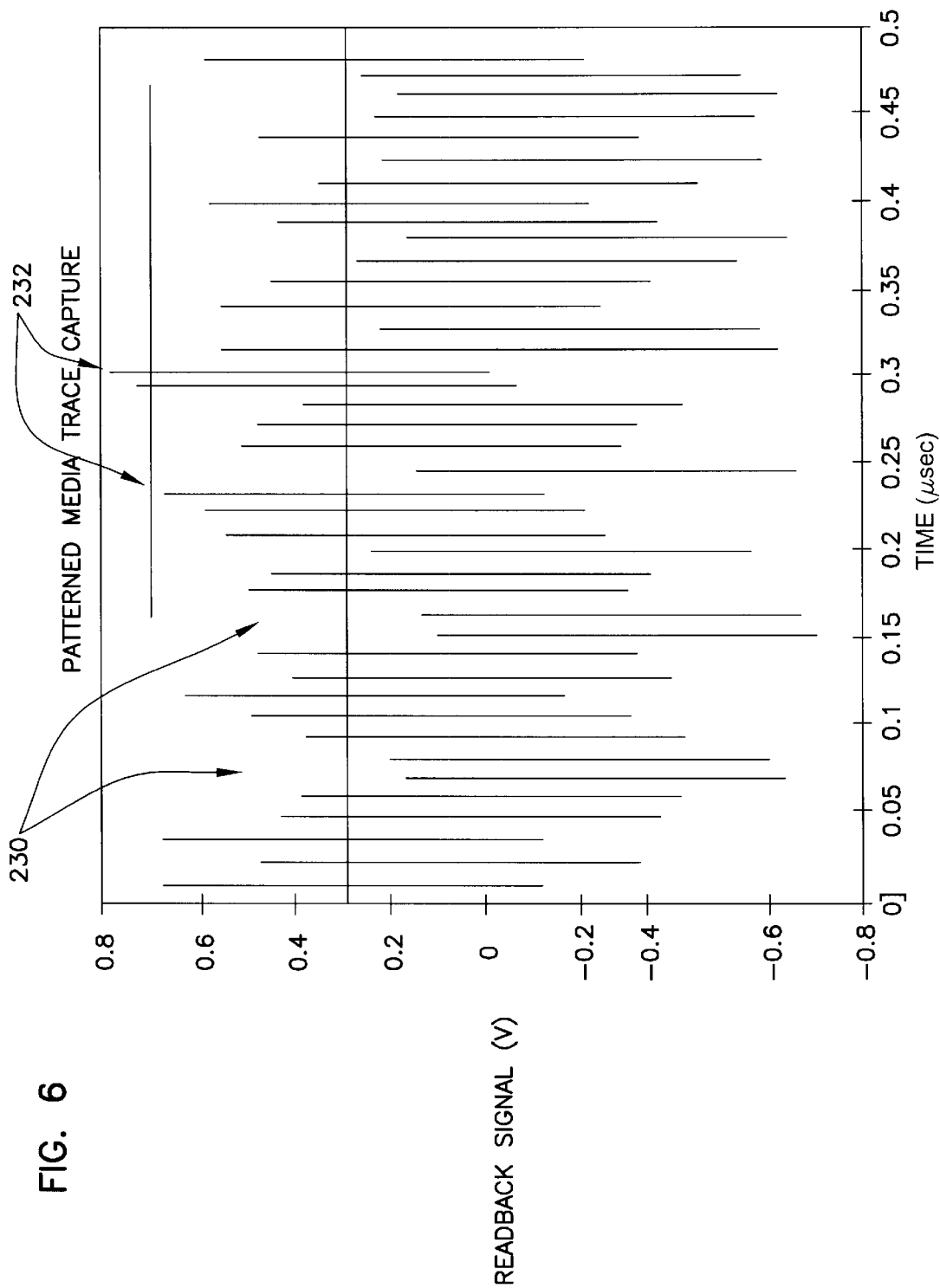
FIG. 6 is a waveform of a readback signal from the servo sector pattern according to the present invention.

FIG. 6 illustrates the readback signal derived from the servo pattern modulated by the magnetic carrier in accordance with the present invention. By selecting a high frequency magnetic carrier, the peak amplitude, illustrated in FIG. 6, varies between two levels, one at about 0.7 volts ($V_2$) representing the lands between pits at 232 (FIG. 3) or regions 304 of high coercivity (FIG. 4), and the other at about 0.3 volts ($V_1$) representing pits at 230 (FIG. 3) or regions 306 of low coercivity (FIG. 4). In the embodiment of FIG. 3, the depth h of pits 226 is inversely proportional to the frequency of the carrier signal. The ratio of the readback signals ($V_2/V_1$) must be adequate to perform demodulation, as described in connection with FIG. 10. In the embodiment of FIG. 3, the ratio of readback signals ($V_2/V_1$) is directly proportional to the depth of pits 226 and inversely proportional to the wavelength of the carrier signal; in the embodiment of FIG. 4, the ratio of readback signals ($V_2/V_1$) is proportional to the ratio of the coercivities of regions 304 and 306 ($H_{C2}/H_{C1}$). For the purposes of the present invention, it is preferred that $V_2$ be at least twice as great as $V_1$ so the ratio $V_2/V_1$ is at least 2, although those skilled in the art will recognize that different or smaller ratios may be employed. The lower limit of the ratio is limited only by the resolution of the electronic circuits. In the example given, the ratio $V_2/V_1$ is about 2.3. For any given ratio $V_2/V_1$ of the peaks of the modulated readback signal, the depth h of pits 226 (FIG. 3) may be minimized to a design depth simply by increasing the carrier frequency of the magnetic carrier recorded through servo sectors 204.

Figure 7:
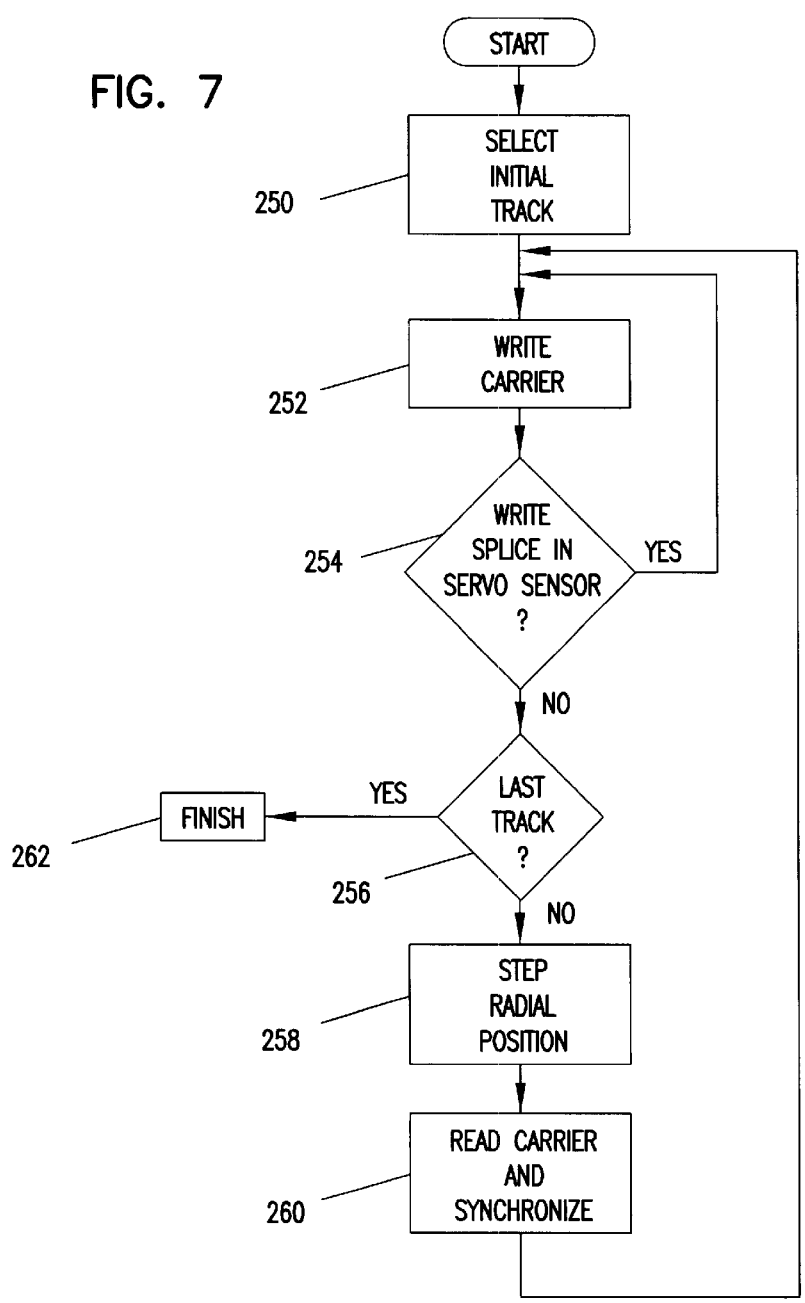
FIG. 7 is a flow diagram illustrating the process of recording the servo carrier of the present invention.

FIG. 7 is a flow diagram illustrating the process for writing the magnetic carrier into servo sectors 204. The process begins at step 250 by selecting an initial data track, such as the innermost or outermost data track of disc 106. While the process of FIG. 7 will be explained with reference to the innermost track being the initial track, the process may commence with the outermost track. In some cases, it may be desirable to begin midway between the innermost and outermost tracks.

The process of FIG. 7 begins by positioning the write head so that the write element is over the initial data track. At step 252 the selected carrier signal applied to the write element to write the magnetic carrier into the disc along a swath that includes at least a portion of the initial data track. The swath of the recorded carrier signal may be larger or smaller than a data track, and does not necessarily correspond to a data track. The carrier signal is written into all of the servo sectors 204 and at least a portion of the user sectors 202. The carrier signal thus recorded is then read by a read head associated with the write head to make certain that a write splice does not appear in a servo sector 204.

A write splice is the point on a swath where the write operation overlaps and ends. Since the length of the swath might not be an exact multiple of the wavelength $\lambda$ of the carrier, the writing of the carrier frequency to the entire swath may end with a mis-match of the written carrier. The location of the mis-match is the write splice. It is preferred that this splice does not appear in a servo sector 204. (The splice may appear in a data region 202 because that region will later be overwritten with user data anyway.)

Based on the carrier signal read from the swath, a determination is made at step 254 of whether the splice appears in a servo sector. If the splice is in a servo sector, the process loops back to step 252 and rewrites the carrier for the swath. If the splice is not in a servo sector, the process continues to step 256 to determine if the swath just written is the last swath to write. If it is not, actuator 118 (FIG. 1) of the write head is operated at step 258 to step the write head outwardly one swath (or inwardly, if the initial swath was at the outermost data track). At step 260, the read head associated with the write head reads the carrier previously written to the adjacent swath and synchronizes the write signal to the phase and frequency of the carrier. The process then loops back to step 252 to write the carrier signal into the next swath location. The process continues through several iterations until the entire disc is written with the magnetic carrier, and step 256 identifies that the last swath has been completed, whereupon the process ends at step 262.

The present invention is preferably carried out in the disc drive, rather than a separate track writer. This provides the advantage of initializing the disc in the drive, thereby eliminating the expense of an additional initializing procedure. Consequently, the carrier signal is written with the write element of the drive head 110 (FIG. 1). Because the width of the write element of a disc drive head is typically smaller than the center to center distance between data tracks, it is preferred that the swaths of carrier signal are recorded in half-track increments across the disc radius. By employing half-step increments to the carrier swaths, the carrier signal is recorded seamlessly across the disc radius. As a result, the magnetic carrier signal is coherently written to the disc.

The process bootstraps the carrier across all of the swaths, and hence all of the data tracks, by synchronizing the signal onto frequency and phase of the carrier written in the previous swath. Thus, when the write element is positioned to a second or subsequent radial swath position (step 258 in FIG. 7), the carrier signal is synchronized onto that written at the immediately prior radial swath position.

The process of FIG. 7 is accomplished by reading the previously written carrier from a first swath during a first revolution of the disc to synchronize the write signal for the write head to the phase and frequency of the previously written carrier. The synchronized carrier is then written to a second swath on the disc during a second revolution. While this process might be carried out by reading the carrier once and writing the entire second carrier over an entire circumference of the second swath, the risk exists that accurate phase synchronization may not be possible over an entire revolution. Consequently, it is preferred that synchronizing and writing be performed on a sector-by-sector basis. Thus, as shown in FIG. 8, after the first swath has been written and the write element is positioned to write the second swath, the read element reads the carrier frequency in selected data regions 261 in the first swath. The write circuit synchronizes the write signal onto the phase and frequency of the read carrier and operates write element to write the synchronized carrier into regions 263 on the second swath, between the synchronizing regions 261. Similarly, upon completion of the second swath, the read element reads, and synchronizes to, the carrier frequency in selected data regions 265 in the second swath and the write element writes the synchronized carrier into region 267 on the third swath. Regions 261 and 265 are circumferencially offset assuring that a synchronizing carrier signal is present in the data region of a prior carrier swath for each successive carrier writing.

Figure 9:
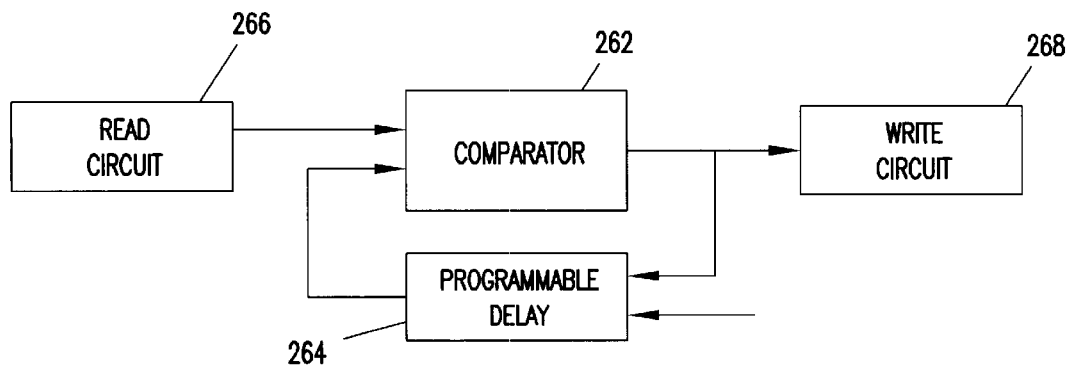
FIG. 9 is a diagram of a phase locked loop useful in explaining a process for compensating for delays while performing the process illustrated in FIG. 7.

Power supply voltage fluctuations and temperature fluctuations in the read and write electronics alter delays of signals in the read and write circuits during carrier writing, leading to phase shifts between adjacent carrier signal swaths. To compensate for these delays, and to achieve phase coherence of the carrier across the seams between adjacent carrier swaths, a phase locked loop is employed, such as illustrated in FIG. 9. The phase locked loop includes comparator 262 that receives the written carrier signal from the read circuits 266 coupled to read/write head 110 (FIG. 1) and supplies a carrier signal output to the write circuits 268 coupled to head 110. Write circuits 268 provide the carrier signal to the write head and to programmable delay 264, which in turn supplies a delayed carrier signal to a second input of comparator 262. Delays in the read and write circuits 266 and 268 may result in the carrier signal provided by write circuits 268 being out of synchronization with that read by the read head. Consequently, the servo electronics (such as on board 130 in FIG. 1) operates programmable delay 264 to delay the write carrier signal until the phases of the signals to comparator 262 are not significantly different, thereby achieving phase coherence and minimizing the effects of delays in the electronic circuits.

While the present invention is described in connection with phase and frequency synchronization, frequency locking procedures may be employed if steps are taken to eliminate carrier frequency drift during initialization.

In most disc drives the read and write elements of head 110 (FIG. 1) are radially offset or skewed. Moreover, the offset is different at different tracks. Consequently, it may be necessary to calculate the radial offset between the read and write elements. One technique for calculating offset is to write a carrier signal onto the disc with the write element and move the read element radially in and out from the carrier swath center until the read head senses some predetermined amplitude change, such as −3 dB. The offset can then be calculated from the read element radial positions. Because offset is different at different radial positions, it may be necessary to perform this process at several radial locations across the disc.

When commencing with the inside diameter track, it is preferred that the read element be offset toward the inner track on the disc rather than the outer track so that the read element reads the carrier generated in the immediately previous loop of the process illustrated in FIG. 7. Conversely, when beginning with the outermost track, it is preferred that the read element be offset toward the outer track of the disc so that the read element reads the carrier signal written in the previous loop of the process illustrated in FIG. 7. In some cases, it may be preferred to begin the process midway between the innermost and outermost tracks on disc 106, working outward from the midtrack during one portion of the process, re-synchronizing onto the written carrier and working inward from the midtrack during a second portion of the process. In any case, it is preferred that the radial offset of the read element be ascertained so that stepping of the read/write head to successive radial positions assures proper reading and writing of the swaths of carrier signal.

The process may be performed by a pre-initialization device, such as a servo writer that writes the carrier signal to the disc before assembly to the disc drive. A principal advantage of pre-initialization devices is that radial offset of the read and write elements across the disc radius is known, thereby eliminating the need for repeated offset calculation. Moreover, exceptionally wide write heads may be employed in servo writers to maximize the carrier swaths over several data tracks and minimize non-repeatable runout due to disc flutter or spindle runout. Additionally, the write elements of most disc drives produce side erasing, which in the present invention increases the risk of radial seams between carrier tracks. Track writers may employ more expensive write elements that reduce side erasing and minimizes the risk of seams.

Figure 10:
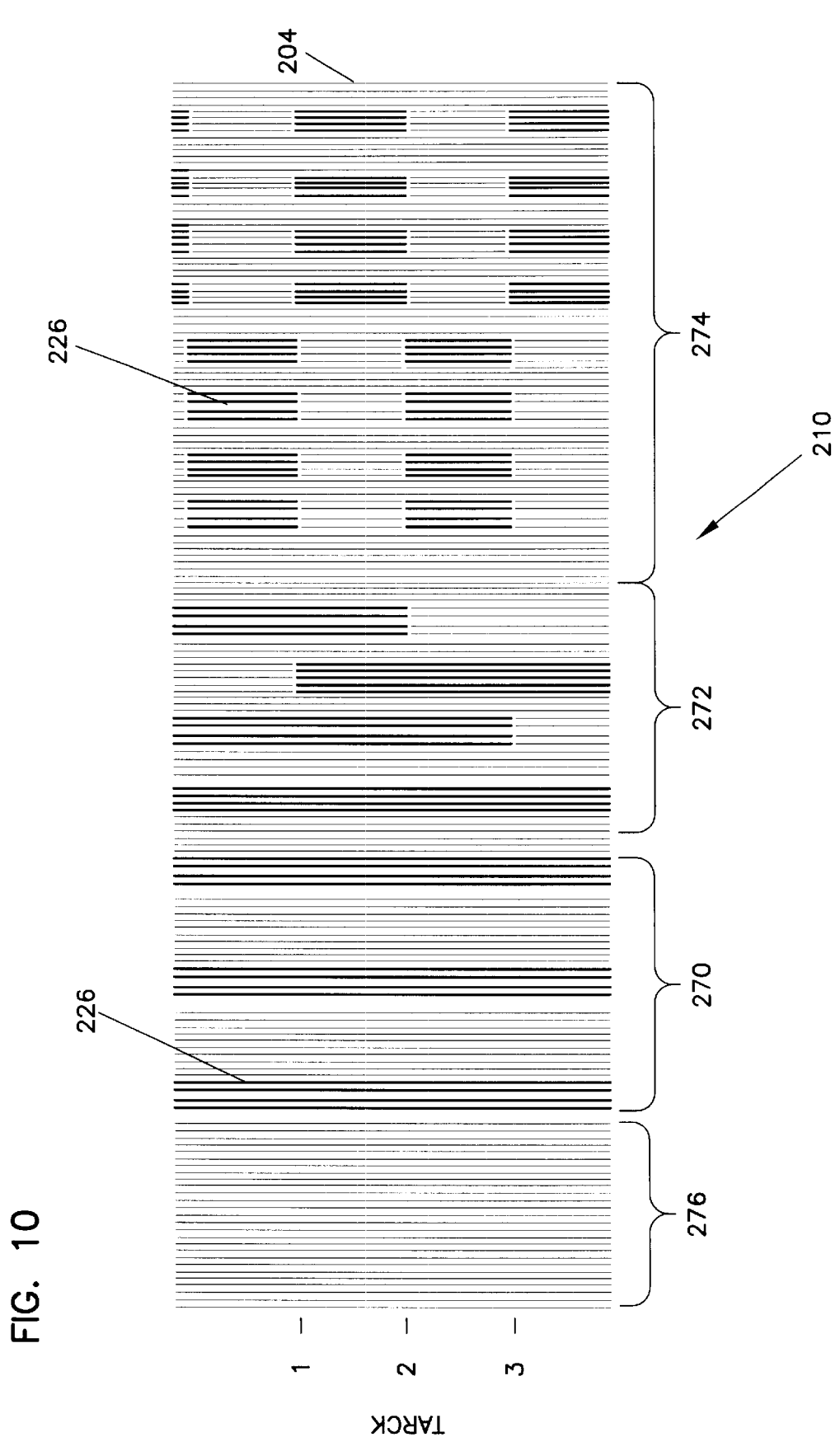
FIG. 10 is a diagram of an exemplary servo pattern according to the present invention.

FIG. 10 illustrates the carrier written to disc 106 over the lands 228 (FIG. 3) or regions 304 (FIG. 4) shown in light lines, and pits 226 (FIG. 3) or regions 306 (FIG. 4) shown in heavy lines, through servo sectors 204 of three tracks 200. The servo sectors along each track are radially adjacent as part of a spoke 210 that extends radially across a plurality of tracks (FIG. 2). Each sector 204 includes regions 270, 272 and 274 that include pits 226 (FIG. 3) or regions 306 (FIG. 4) written in patterns to reflect servo data, such as synchronization marks (region 270), track and/or sector identification (region 272) and position error identification (region 274). As illustrated in FIG. 10, and particularly in the regions of the synchronization marks of region 270 and identification marks of region 272, some of the pits 226 or regions 306 are in the shape of grooves or lines extending radially over two or more tracks. The pattern of grooves or lines in region 270 represents the servo burst frequency of the pattern of servo pits 226 or regions 306. Lock region 276 may be included in the completed servo sector, or may be formed in the user data region 202 during the writing of the carrier for use in bootstrapping the writing of the carrier, as described in connection with FIG. 7. More particularly, if readback signals are demodulated as described in connection with FIG. 11, lock region 276 is included in the completed servo sector for recovery of the demodulation signal. On the other hand, if another technique, such as peak detection, is employed to recover the readback signal, lock region 276 may be outside the servo sector. If lock region 276 is not part of the finished servo sector (thus is written to the user data region during writing of the carrier), the lock data is overwritten with user data during later use of the disc.

Figure 11:
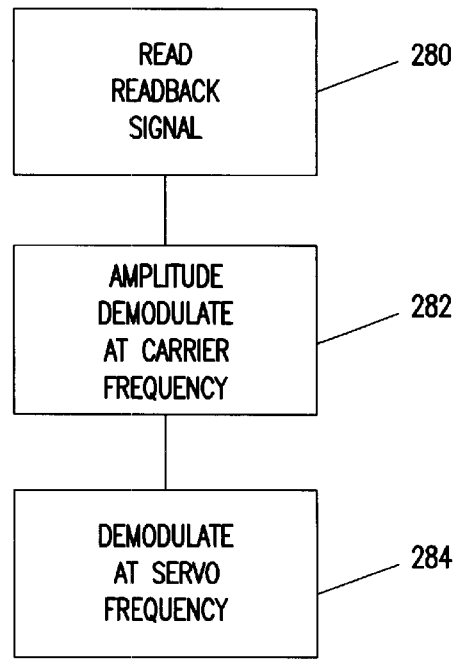
FIGS. 11 and 12 are flow diagrams illustrating processes of recovering servo data from a disc containing a servo pattern according to two embodiments of the present invention.

FIG. 11 illustrates a process of recovering servo data from a servo sector according to the present invention. At step 280, head 110 recovers a readback signal from the servo sector. The readback signal is as illustrated in FIG. 6 with low amplitude peaks in regions 230 representing pits 226 and high amplitude peaks in regions 232 representing the disc surface 228. In one form of the invention, the readback signal is amplitude demodulated at step 282 using a first demodulating signal at the magnetic carrier frequency (e.g., 75 to 100 MHz) that is recovered from the lock region 276 within the servo sector. The resulting demodulated signal is the servo signal, which is turn is demodulated at step 284 using a second demodulating signal at the servo frequency (e.g., 20 MHz to 45 MHz), thereby deriving the servo data.

Figure 12:
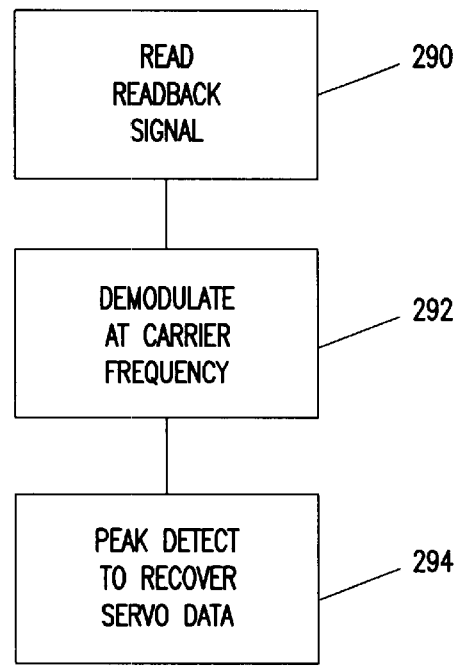

FIG. 12 illustrates a process of recovering servo data from a servo sector according to a second embodiment of the present invention. At step 290, head 110 recovers a readback signal from the servo sector. The readback signal is as illustrated in FIG. 6 with low amplitude peaks in regions 230 representing pits 226 or regions 306 and high amplitude peaks in regions 232 representing the disc surface 228 (FIG. 3) or regions 304. In this form of the invention, the readback signal is demodulated at step 292 in a manner similar to that illustrated in the process of FIG. 11, to derive the servo signal. The servo data are derived from the servo signal at step 294 using peak detection or other similar techniques well known in the art.

In any case, the servo data are read from a disc in accordance with the present invention by reading the magnetic field generated by the high frequency carrier signal as amplitude modulated by the pits or regions of low coercivity. The readback signal is recovered and demodulated by the carrier signal frequency (e.g., 75 to 100 MHz), thereby deriving the servo signal having a servo burst frequency based on the irregularities in magnetic properties of the disc (e.g., 20 to 45 MHz). The servo data is then derived from the servo signal using the servo burst frequency.

Alternatively characterized, a first contemplated embodiment of the present invention provides a magnetic medium comprising a magnetic disc 106 defining a read surface 228 having a plurality of tracks 200. Irregularities in the medium are arranged in a pattern along the servo sectors 204 of at least one of a plurality of tracks 200. In one form of the magnetic medium, the irregularities comprise a plurality of pits 226 that extend into the disc. The pits are arranged along the servo sector in a servo pattern (FIG. 10) and have a defined depth, h. In another form of the magnetic medium, the irregularities comprises a plurality of regions 306 of reduced magnetic coercivity arranged along the servo sector in the servo pattern. The servo pattern has a servo frequency (e.g., between 20 MHz and 45 MHz). A magnetic carrier is recorded in the magnetic body along the servo sector, the magnetic pattern having a carrier frequency (e.g., 75 to 100 MHz) that is greater than the servo frequency.

A second contemplated embodiment of the invention provides a process of manufacturing such a magnetic disc in which a plurality of tracks 200 are defined on the read surface 228, with at least one servo sector 204 being defined along each of at least some of the plurality of tracks. In one embodiment of the manufacturing process, a plurality of pits 226 are formed in the read surface in a servo pattern along each servo sector 204. The servo pattern has a servo frequency, and the pits have a depth, h, into the read surface. A magnetic carrier is written in the magnetic disc along the servo sector portions at a carrier frequency, the carrier frequency being greater than the servo frequency such that $$h = \frac{\lambda}{2\pi} \ln\left(\frac{V_2}{V_1}\right),$$

where $\lambda$ is the wavelength of the magnetic carrier, $V_1$ is a first readback signal peak amplitude provided by the read head confronting a pit and $V_2$ is a second readback signal peak amplitude provided by the read head confronting the disc surface between pits.

In another embodiment of the manufacturing process, an ion beam 314 is directed to regions 306 of the disc surface to reduce the magnetic coercivity of the disc in the region 306. The magnetic carrier is written in the magnetic disc along the servo sector portions at the carrier frequency, the carrier frequency being greater than the servo frequency such that $$\frac{V_2}{V_1} \propto \frac{H_{C2}}{H_{C1}}.$$

In a preferred process of manufacture, the carrier is written by positioning a write head to confront a first radius of the read surface at step 250. The magnetic carrier is then continuously written at step 252 along a circular region (e.g., at a track 200) at the first radius that includes a servo sector 204 and a portion before the servo sector. The write head is then stepped during step 258 to confront a second radius (e.g., one-half track from the first track 200) adjacent the first radius. The write carrier signal is synchronized to the magnetic carrier previously written (step 260), and the magnetic carrier is continuously written along a circular region (e.g., the second track) at the second radius that includes a servo sector and a portion before the servo sector. The process is repeated until the entire disc is written with the carrier (step 256, 262).

In a preferred process of use, servo data is recovered from a magnetic disc 106 as above described. The magnetic field from a servo sector of a selected track on the disc is read at step 280, 290 to derive a readback signal, as illustrated in FIG. 6. The readback signal is amplitude recovered at step 282, 292 at the carrier frequency. The resulting signal is a servo signal. The servo signal is demodulated at step 284, 294 using a demodulating signal at the servo frequency to derive servo data.

Although the present invention has been described with reference to a servo pattern for embedded servo systems with magnetic writing, those skilled in the art will recognize that the present invention may be practiced with other system modifications, including but not limited to dedicated servo systems and systems employing other writing technologies, such as magneto-optic writing.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application for the surface irregularities while maintaining substantially the same functionality without departing from the scope and spirit of the present invention. Thus, while the invention is described in connection with writing the carrier signal on the disc using the disc drive electronics and heads, the process of writing the carrier signal might be accomplished using a servo writer. Additionally, a conventional track writer might be employed by locking the carrier to a clock derived from circumferential timing of the disc or even using self-clocking techniques from the write head. In addition, although one embodiment described herein is directed to pits as depressions in the disc surface, it will be appreciated by those skilled in the art that the teachings of the present invention can be applied to other forms of surface irregularities, including raised bump patterns, and doublet patterns comprising a pit and bump, without departing from the scope and spirit of the invention. Additionally, while another embodiment described herein is directed to employing an ion beam to reduce the magnetic coercivity of regions of the disc forming the servo pattern, other techniques, including implantation, may be employed to alter the magnetic characteristics without departing from the scope and spirit of the invention.

What is claimed is:

1. A magnetic medium comprising:
   a magnetic body defining a read surface having a plurality of tracks;
   a pattern of irregularities in magnetic properties of the magnetic body extending along a length of a servo sector, the pattern of irregularities representing servo data at a servo frequency; and
   a magnetic pattern recorded in the magnetic body through the length of the servo sector, the magnetic pattern having a carrier frequency greater than the servo frequency and exhibiting first and second magnetic strengths in the pattern of the irregularities, the first and second magnetic strengths defining a predetermined ratio of magnetic strengths.

2. The magnetic medium of claim 1, wherein the magnetic body is a magnetic disc and the irregularities in magnetic properties comprises surface irregularities having a depth in a read surface of the disc, wherein the predetermined ratio of magnetic strengths is detectable by a read head confronting the pattern of irregularities to generate signal amplitudes having a ratio proportional to $$e^{-\frac{2\pi h}{\lambda}},$$

where h is the depth of the surface irregularities and X is a wavelength of the carrier frequency.

3. The magnetic medium of claim 1, wherein the magnetic body is a magnetic disc and the irregularities in magnetic properties comprises discontinuities in magnetic coercivity in the magnetic disc, wherein the predetermined ratio of magnetic strengths is a ratio of magnetic coercivities represented by $$\frac{H_{C2}}{H_{C1}},$$

where $H_{c2}$ is greater than $H_{c1}$.

4. The magnetic medium of claim 1, wherein the carrier frequency is at least twice the servo frequency.

5. The magnetic medium of claim 3, wherein $H_{c2}-H_{c1}$ is between about 700 and 900 Oersteds.

6. A process of manufacturing a magnetic disc for use with a read head in a disc drive, the read head being designed to fly a predetermined height from a read surface of the disc to provide a readback signal having amplitudes based on magnetic fields generated from the disc, the process comprising steps of:
   (a) defining a plurality of tracks on the read surface, each track having at least one data sector and at least one servo sector;
   (b) forming a plurality of irregularities in magnetic properties of the magnetic disc in a pattern along a length of each servo sector, the pattern having a servo frequency; and
   (c) writing a magnetic carrier in the magnetic disc through the length of the servo sectors at a carrier frequency that is greater than the servo frequency, to form a pattern of first and second magnetic strengths in the pattern of the irregularities defining a predetermined ratio of magnetic strengths.

7. The process of claim 6, wherein step (b) comprises steps of:
   b1) forming surface irregularities in the disc having an elevation different from the read surface and proportional to $$\frac{\lambda}{2\pi}\ln\left(\frac{V_2}{V_1}\right),$$

where λ is the wavelength of the carrier frequency, $V_1$ is a first readback signal peak amplitude provided by the read head confronting a surface irregularity and $V_2$ is a second readback signal peak amplitude provided by the read head confronting the read surface.

8. The process of claim 7, wherein step (c) comprises steps of:
   (c1) positioning a write element to confront a first radius of the read surface,
   (c2) writing the magnetic carrier at the first radius along a circular region of the disc that includes a servo sector and at least a portion of a data sector,
   (c3) stepping the write element to confront a second radius of the read surface adjacent the first radius,
   (c4) locking a carrier signal to the write element onto the magnetic carrier written in step (c2),
   (c5) writing the magnetic carrier at the second radius along a circular region of the disc that includes a servo sector and at least a portion of a data sector, and
   (c6) repeating steps (c3) through (c5) until all of the servo sectors are written with the magnetic carrier.

9. The process of claim 7, wherein step (c3) is performed at half-track increments.

10. The process of claim 7, wherein step (c4) is performed by
    (c4i) reading the magnetic carrier written in step (c2), and
    (c4ii) selectively delaying the read magnetic carrier to derive the carrier signal.

11. The process of claim 7, further including before step (b), steps of:
    (d) selecting a ratio for $V_2/V_1$ adequate to demodulate the readback signal, and
    (e) selecting a magnetic carrier having a small wavelength λ, to minimize the effect of the surface irregularities on flying characteristics of the head.

12. The process of claim 6, wherein the magnetic disc has a magnetic coercivity and step (b) comprises steps of:
    (b1) defining first regions in a pattern along each servo sector, the pattern of regions defining a servo frequency,
    (b2) reducing the magnetic coercivity of the magnetic disc in the first regions so that $$\frac{V_2}{V_1} \propto \frac{H_{C2}}{H_{C1}},$$

where $H_{C2}$ is a magnetic coercivity of the magnetic disc, $H_{C1}$ is the reduced magnetic coercivity, $V_1$ is a first readback signal peak amplitude provided by the read head confronting a first region of reduced coercivity and $V_2$ is a second readback signal peak amplitude provided by the read head confronting a region of the magnetic disc outside the first region.

13. The process of claim 12, wherein step (c) comprises steps of:
   (c1) positioning a write element to confront a first radius of the read surface,
   (c2) writing the magnetic carrier at the first radius along a circular region of the disc that includes a servo sector and at least a portion of a data sector,
   (c3) stepping the write element to confront a second radius of the read surface adjacent the first radius,
   (c4) locking a carrier signal to the write element onto the magnetic carrier written in step (c2),
   (c5) writing the magnetic carrier at the second radius along a circular region of the disc that includes a servo sector and at least a portion of a data sector, and
   (c6) repeating steps (c3) through (c5) until all of the servo sectors are written with the magnetic carrier.

14. The process of claim 13, wherein step (c3) is performed at half-track increments.

15. The process of claim 13, wherein step (c4) is performed by
   (c4i) reading the magnetic carrier written in step (c2), and
   (c4ii) selectively delaying the read magnetic carrier to derive the carrier signal.

16. The process of claim 6, wherein the magnetic disc has a first magnetic coercivity, $H_{C2}$, and step (b) comprises steps of:
   (b1) forming a mask on the read surface of the disk defining first and second regions on the disc surface in a pattern defining a servo frequency along each servo sector, and
   (b2) applying an ion beam to the second regions to change the magnetic coercivity of the magnetic disc in the second regions to a second coercivity, $H_{C1}$, so that $$\frac{V_2}{V_1} \propto \frac{H_{C2}}{H_{C1}},$$

where $V_2$ is a first readback signal peak amplitude provided by the read head confronting the first region and $V_1$ is a second readback signal peak amplitude provided by the read head confronting the second region.

17. A process of recovering servo data from a magnetic disc having a read surface containing a plurality of tracks each having servo sectors containing a plurality of irregularities in magnetic properties of the disc arranged in servo patterns at a predetermined servo frequency, and a magnetic carrier recorded in the servo sectors at a predetermined carrier frequency, the process comprising steps of:
   (a) reading a magnetic field from a servo sector of a selected track on the disc to derive a readback signal, the readback signal representing servo data at the servo frequency and representing the carrier frequency;
   (b) demodulating the readback signal at the carrier frequency to recover a servo signal representing the servo data; and
   (c) recovering the servo data from the servo signal.

18. The process of claim 17, wherein step (c) is performed by demodulating the servo signal with a second demodulating signal at the servo frequency.

19. The process of claim 17, wherein step (c) is performed by detecting peaks in the servo signal.

20. The process of claim 17, wherein the irregularities in magnetic properties are selected from the group comprising surface irregularities at an elevation different from a nominal surface of the read surface and discontinuities in magnetic coercivity of the magnetic disc.

* * * * *